United States Patent
Gupta et al.

(10) Patent No.: US 11,632,261 B2
(45) Date of Patent: Apr. 18, 2023

(54) MANAGING MULTICAST GROUP TRAFFIC

(71) Applicant: HEWLETT PACKARD ENTERPRISE DEVELOPMENT LP, Houston, TX (US)

(72) Inventors: Gopal Gupta, Bangalore (IN);
Abhinesh Mishra, Bangalore (IN);
Isaac Theogaraj, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 48 days.

(21) Appl. No.: 17/221,816

(22) Filed: Apr. 4, 2021

(65) Prior Publication Data

US 2022/0038299 A1  Feb. 3, 2022

(51) Int. Cl.
*H04L 12/18* (2006.01)
*H04L 9/40* (2022.01)
*H04L 12/46* (2006.01)
*H04L 45/16* (2022.01)

(52) U.S. Cl.
CPC ........ *H04L 12/1886* (2013.01); *H04L 12/185* (2013.01); *H04L 12/4633* (2013.01); *H04L 45/16* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 8,660,008 B2 | 2/2014 | Babiarz et al. | |
| 8,897,261 B2 | 11/2014 | Liu et al. | |
| 9,049,030 B1 | 6/2015 | Pogde et al. | |
| 9,100,203 B2 | 8/2015 | Yeung et al. | |
| 9,306,801 B2 | 4/2016 | Yang et al. | |
| 2008/0186962 A1* | 8/2008 | Sinha | H04L 12/185 370/389 |
| 2014/0280846 A1* | 9/2014 | Gourlay | H04L 63/101 709/223 |
| 2017/0310588 A1* | 10/2017 | Zuo | H04L 12/6418 |
| 2020/0228356 A1* | 7/2020 | Meng | H04L 12/18 |
| 2020/0260125 A1* | 8/2020 | Xiong | H04L 67/101 |
| 2021/0281515 A1* | 9/2021 | Basavaraj | H04L 47/125 |

OTHER PUBLICATIONS

Author Unknown, Dynamic Segmentation 2.0, pp. 1-27, Sep. 24 (Year: 2019).*

* cited by examiner

*Primary Examiner* — Christopher M Crutchfield
(74) *Attorney, Agent, or Firm* — Hewlett Packard Enterprise Patent Department

(57) ABSTRACT

Some examples relate to managing multicast group traffic. In an example, a switch anchor controller receives a request for a multicast group from an associated network switch in a multicast-capable network. The associated network switch registers to the switch anchor controller in the multicast-capable network. In response to the request, the switch anchor controller selects a non-anchor controller in the multicast-capable network to serve the multicast group to the associated network switch. The switch anchor controller provides the information related to the non-anchor controller to the associated network switch, which in response creates a specific multicast tunnel between the associated network switch and the non-anchor controller to transfer multicast traffic related to the multicast group.

20 Claims, 5 Drawing Sheets

MANAGING MULTICAST GROUP TRAFFIC

BACKGROUND

Multicast technology is being increasingly favored to provide rich content over a network. Multicast is a mechanism for transmitting data from a single source (for example, a server) to multiple receivers (for example, personal computers) on a network. Multicast packets are replicated down appropriate paths in a network to create the most efficient routing mechanism possible. The sender may send a data packet once, even if the packet is to be delivered to multiple receivers.

Multicast technology may be used by organizations to send data (especially, multimedia content) over a network. Multicast technology allows host computer systems, who have subscribed to a particular content data flow of a content server, to receive the content. Host systems may signify their willingness to receive a particular data from a content server by joining a particular multicast group. Once host systems join a particular group, a multicast distribution tree is created for that group. The flow of data from a multicast source system to receiver devices may be managed by a multicast protocol. Some non-limiting examples of protocols that may be used to manage flow of data in a multicast system may include Internet Group Management Protocol (IGMP), Multicast Listener Discovery (MLD) protocol, Protocol Independent Multicast (PIM), and Distance Vector Multicast Routing Protocol (DVMRP).

Dynamic Segmentation enforces consistent policies across wired and wireless networks to keep traffic for any user or device separate and secure, regardless of the application or service.

BRIEF DESCRIPTION OF THE DRAWINGS

The following detailed description references the drawings, wherein.

DETAILED DESCRIPTION

Figure 1:
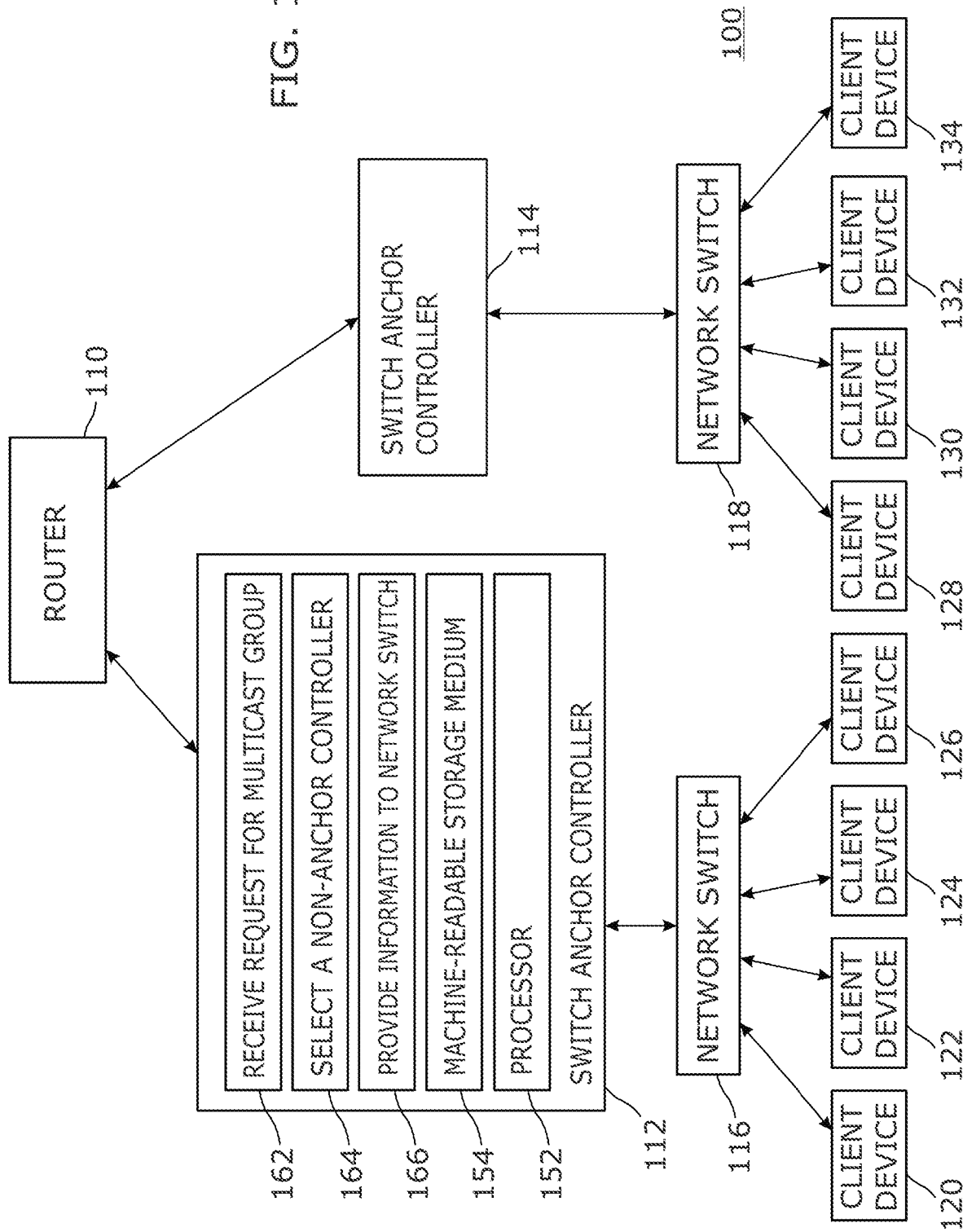
FIG. 1 is a block diagram of an example computing environment for managing multicast group traffic.

In a multi-controller setup, dynamic segmentation allows wired and wireless devices to be treated similarly, and to be handled in bulk. In a dynamic segmentation design, the network connects tunnels from the devices to a controller on a per-port basis through an extended switch. Each switch is anchored to a controller and may have a per-port multicast tunnel. Although per-port tunnel is helpful it can lead to poor multicast traffic flow. A switch can have multiple users subscribed to different multicast groups, however, in a current implementation, the entire multicast traffic may flow in through a single multicast tunnel between the switch and its anchor controller (known as Switch Anchor Controller (SAC)). This is not desirable.

Also, in case of multiple switches and multiple controllers in a cluster, same multicast groups may be present in different controllers of the cluster. For instance, if there are multiple streams of the same multicast group traffic flowing from a router to different controllers of a cluster, it leads to wastage of network bandwidth. Considering that in some scenarios multicast streams may range from 5 Mbps to 50 Mbps per multicast group, this wastage may be significant. Another challenge with this architecture is load balancing of multicast traffic from controller to switch. For example, if out of two switches, say Sw1 and Sw2, users of Sw1 are subscribed to multicast groups and users of Sw2 are not, then the link between Sw1 and its anchor controller would be heavily consumed whereas the link between Sw2 and its respective anchor controller might be underutilized. These are not desirable scenarios.

Proposed is a solution that load balances multicast traffic on the link between a switch anchor controller and an associated network switch in a multicast-capable network. In an example, the dependency on an anchor controller for group specific multicast traffic is removed. A switch forms a multicast group specific tunnel with any non-anchor controller serving that particular multicast group in the multicast network. This controller becomes Group Anchor Controller for the requested multicast group traffic. When a user requests for a new multicast traffic, the switch anchor controller informs the switch about the non-anchor controller which is serving the required multicast group. The switch then forms a specific tunnel for that particular multicast group with the non-anchor controller.

The present disclosure describes various examples for managing multicast group traffic. In an example, a switch anchor controller receives a request for a multicast group from an associated network switch in a multicast-capable network. The switch anchor controller represents a controller to which the associated network switch registers to in the multicast-capable network. In response to the request, the switch anchor controller selects a non-anchor controller in the multicast-capable network to serve the multicast group to the associated network switch. The switch anchor controller then provides the information related to the non-anchor controller to the associated network switch, which in response creates a specific multicast tunnel between the associated network switch and the non-anchor controller to transfer multicast traffic related to the multicast group.

FIG. 1 is a block diagram of an example computing environment 100 for managing multicast group traffic. In an example, computing environment 100 may include a router 110, switch anchor controllers 112 and 114, network switches 116 and 118, and client devices 120, 122, 124, 126, 128, 130, 132, and 134. Although one router, two controllers, two network switches, and eight client devices are shown in FIG. 1, other examples of this disclosure may include more than one router, more or fewer than two switch anchor controllers, more or fewer than two network switches, and more or fewer than eight client devices.

Router 110, switch anchor controllers 112 and 114, network switches 116 and 118, and client devices 120, 122, 124, 126, 128, 130, 132, and 134 may be communicatively coupled, for example, via a computer network. The computer network may be a wireless or wired network. In an example, the computer network may be used to transmit and route multicast content.

In an example, router 110 is communicatively coupled to a multicast source system (not shown) including a computing device (e.g., a server) capable of executing machine-readable instructions. The multicast source system hosts multicast content. Multicast content may include, for example, data, image, audio, video, multimedia, and other like content. Multicast content may be shared with client computer devices (also known as multicast subscribers) through router.

In an example, switch anchor controllers 112 and 114 may each be a hardware entity, a software entity (machine-readable instructions) or a combination thereof. Some non-limiting examples may include a server, a computing device, a dedicated hardware, and a virtualized device.

Multicast technology allows client devices (for example, 120), who have subscribed to a particular content data flow of a source system to receive content from the source system. Client devices (for example, 120, 122, 124, 126, 128, 130, 132, and 134) signify their willingness to receive a particular data from a content server by joining a particular multicast group. Once client devices join a particular group, a multicast distribution tree may be created for that group. The flow of data from a multicast source system to receiver devices over a multicast-capable network is managed by a multicast protocol. Examples of multicast protocol include Internet Group Management Protocol (IGMP) and Multicast Listener Discovery (MLD) protocol.

In an example, switch anchor controller 112 may include a processor 152 and a machine-readable storage medium 154 communicatively coupled through a system bus. In an example, machine-readable storage medium 154 may store machine-readable instructions (i.e. program code) 162, 164, and 166 that, when executed by processor 152, may at least partially implement some or all functions of computing system.

In an example, instructions 162 may be executed by processor 152 of switch anchor controller 112 to receive a request for a multicast group from an associated network switch (e.g., 116) in a multicast-capable network. As used herein, the term "switch anchor controller" includes a controller to which a network switch (or network switches) registers itself in the multicast-capable network. The network switch that registers itself to a switch anchor controller may be termed as "associated network switch" of the switch anchor controller. Post registration with a SAC, the SAC may provide additional cluster related information to an associated network switch such as Standby-Switch-Anchor-Controller (S-SAC), Node-list, bucket map, etc. This is done to form a one-to-one mapping between a switch anchor controller and an associated network switch in the multicast-capable network.

In an example, the multicast-capable network may include a cluster of controllers (e.g., 112 and 114). In an example, each of the controllers may act as switch anchor controller (SAC) for their respective associated network switch (or network switches). Referring to FIG. 1, in an example, controller 112 may act as switch anchor controller for network switch 116 and controller 114 may act as switch anchor controller for network switch 118.

In an example, multicast groups in the multicast-capable network may be distributed among the controllers (e.g., 112 and 114) in a manner that avoids duplicate multicast groups among the controllers (e.g., 112 and 114). In an example, to avoid duplication, distribution of multicast groups among the controllers (e.g., 112 and 114) may be carried out considering at least one of a processing capacity, memory, and availability of link bandwidth of respective controller in the multicast-capable network.

In a further example, the distribution may be based on historical throughput or packet loss data for earlier multicast streams on respective controller in the multicast-capable network.

In a still further example, the distribution may be based on a priority of traffic associated with a multicast group. For example, for a higher priority stream, a controller with a relatively higher throughput may be preferred over others.

In a yet another example, the distribution may be based on a type of the requested multicast group. For example, in case of multicast video with disparate qualities such as standard definition (SD), high definition (HD), full FD (FHD), ultra HD (UHD), etc. the distribution may be based on bandwidth consumed.

In a further example, the distribution may be based on a security entity score of a controller. The security entity score may be based on at least one of a number of unsecured ports and high-risk security events previously detected on respective controller.

In an example, the distribution may be performed via a service (machine-readable instructions) executed by an on-premise device, for example, a computing or network device (e.g., 112) on the multicast-capable network, or outside of an enterprise, for example, in a cloud environment.

In an example, in response to a request for a multicast group from an associated network switch, instructions 164 may be executed by processor 152 of switch anchor controller 112 to select a non-anchor controller in the multicast-capable network to serve the multicast group to the associated network switch. In an example, the switch anchor controller 112 may select a non-anchor controller from any of the controllers serving the requested multicast group at random. In other words, if more than one non-anchor controller is serving the requested multicast group, the switch anchor controller may select any one of them.

In another example, the switch anchor controller 112 may select a non-anchor controller based on at least one of a processing capacity, memory, and availability of link bandwidth on a non-anchor controller present in the multicast-capable network.

In a further example, the switch anchor controller may select a non-anchor controller based on packet loss data for earlier multicast streams on a non-anchor controller.

In a still further example, the switch anchor controller may select a non-anchor controller based on a priority of traffic associated with the requested multicast group. For example, for a higher priority stream, a controller with a relatively higher throughput may be selected.

In a yet another example, the switch anchor controller may select a non-anchor controller based on a type of the requested multicast group. For example, whether the requested multicast group is SD, HD, FHD, or UHD.

In a further example, the switch anchor controller may select a non-anchor controller based on a security entity score of a controller. The security entity score may be based on at least one of a number of unsecured ports and high-risk security events previously detected on a non-anchor controller.

Figure 2:
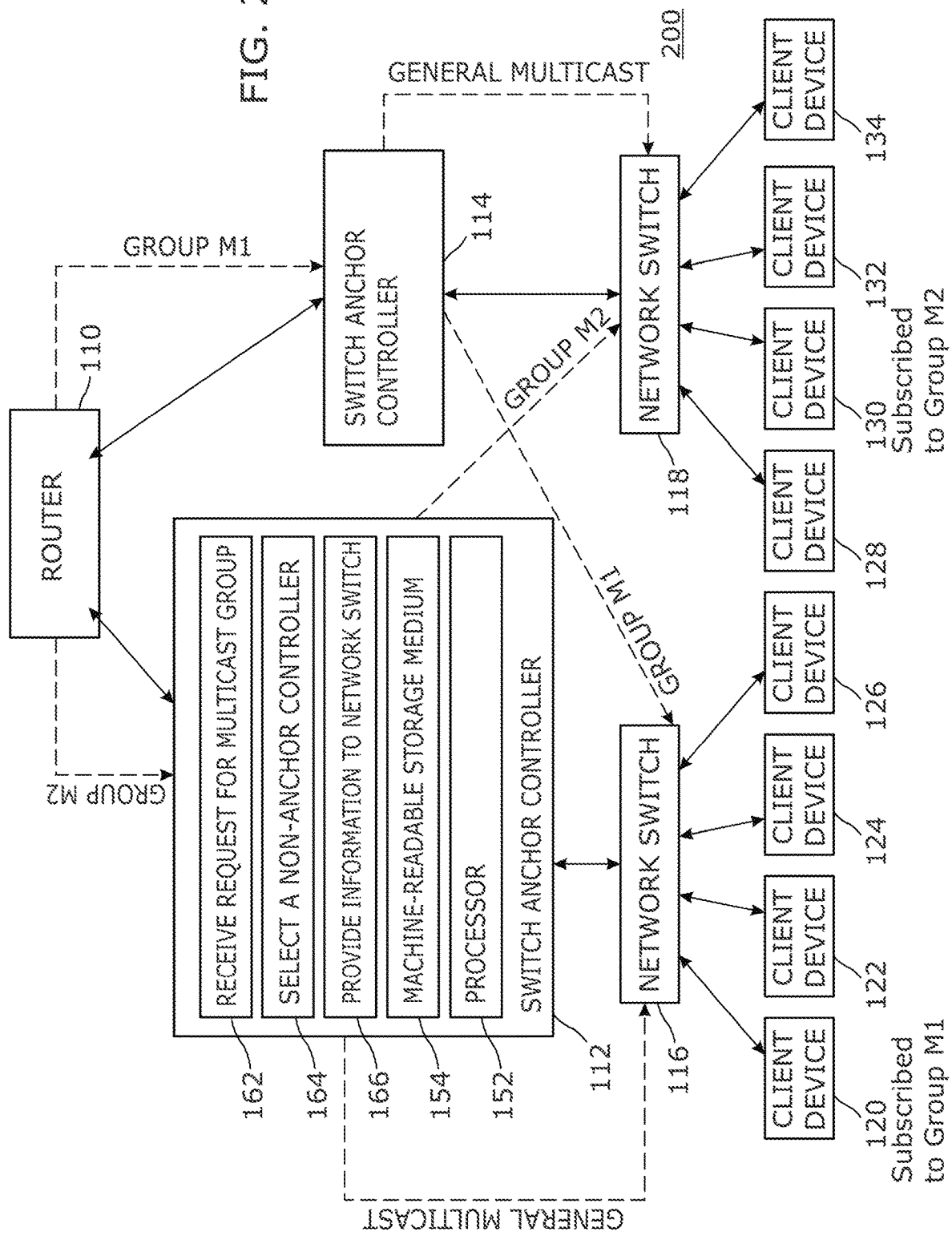
FIG. 2 is a block diagram of an example computing environment for managing multicast group traffic.

Referring to FIG. 2, in an example, a client device 120 may send a request fora multicast group M1 to network switch 116, which in turn may share the request with its switch anchor controller 112. In response to the request, switch anchor controller 112 may select a non-anchor controller in the multicast-capable network to serve the multicast group. In an example, the switch anchor controller may select a non-anchor controller (e.g., 114) based on at least one of the criteria mentioned above. For example, the switch anchor controller may select a non-anchor controller based on at least one of a processing capacity, memory, and availability of link bandwidth on a non-anchor controller present in the multicast-capable network.

In another example, a client device 130 may send a request for a multicast group M2 to network switch 118, which in turn may share the request with its switch anchor controller 114. In response to the request, switch anchor controller 114 may select a non-anchor controller (e.g., 112) in the multicast-capable network to serve the multicast group.

Once a non-anchor controller has been selected, instructions 166 may be executed by processor 152 of switch anchor controller 112 to provide information related thereto the associated network switch.

In an example, in response to the information, a specific multicast tunnel may be created between the associated network switch and the non-anchor controller to transfer multicast traffic related to the multicast group. The network switch may form a multicast group specific tunnel with the non-anchor controller for that particular multicast group. The per-user tunneled node tunnels multicast traffic on a per-user client basis, tunneling traffic of a given client based on user role. The controller selected to serve the requested multicast group may be termed as group anchor controller. Thus, when a non-anchor controller is selected to serve the requested multicast group traffic, it becomes the group anchor controller. At a time, a network switch may have multiple group anchor controllers, each serving unique multicast group traffic to the switch. However, in an example, in response to a request for a multicast group, the switch anchor controller 112 may select itself to serve the multicast group. In such case, the switch anchor controller 112 may act as the group anchor controller for the requested multicast group traffic.

In an example, the selected non-anchor controller may be termed as group anchor controller for the requested multicast group traffic.

In an example, the generic multicast traffic may be transferred between the associated network switch and the switch anchor controller through a generic tunnel.

Router 110, switch anchor controllers 112 and 114, network switches 116 and 118, and client devices 120, 122, 124, 126, 128, 130, 132, and 134 may be communicatively coupled, for example, via a computer network. The computer network may include, for example, a Local Area Network (LAN), a Wide Area Network (WAN), a Metropolitan Area Network (MAN), a Storage Area Network (SAN), a Campus Area Network (CAN), or the like. Further, the computer network may be a public network (for example, the Internet) or a private network (for example, an intranet). In an example, the computer network may be an IPv4 or IPv6 network.

In an example, switch anchor controllers 112 and 114 may each store and execute a computer application (machine-executable instructions). In an example, switch anchor controllers may each include a network device (for example, a network switch). In an example, switch anchor controllers 112 and 114 may help with provisioning and maintaining of network switches (e.g., 116 and 118), Wi-Fi Access Points (APs) or Internet of Things (IOT) controllers (that may manage IOT devices such as Bluetooth Low Energy devices). In an example, switch anchor controllers 112 and 114 may be central traffic aggregators in order to provide secure and quality network access to all users. In an example, clustering technology may be used to bring together controllers (such as switch anchor controllers 112 and 114) as one group, on which network switches (e.g., 116 and 118) or Wi-Fi APs may terminate.

Network switches 116 and 118 may each be used to transfer multicast data from router to client devices. Client devices may each be any type of computing device that is capable of executing machine-readable instructions. Examples of the computing device may include, without limitation, a server, a desktop computer, a notebook computer, a tablet computer, a thin client, a mobile device, a personal digital assistant (PDA), a phablet, and the like. Client devices may each include a client or multicast application for receiving multicast data from a source system (not shown).

Processor 152 may be any type of Central Processing Unit (CPU), microprocessor, or processing logic that interprets and executes machine-readable instructions stored in machine-readable storage medium 154. Machine-readable storage medium 154 may be a Random Access Memory (RAM) or another type of dynamic storage device that may store information and machine-readable instructions that may be executed by processor 152. For example, machine-readable storage medium 154 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 154 may be a non-transitory machine-readable medium.

Figure 3:
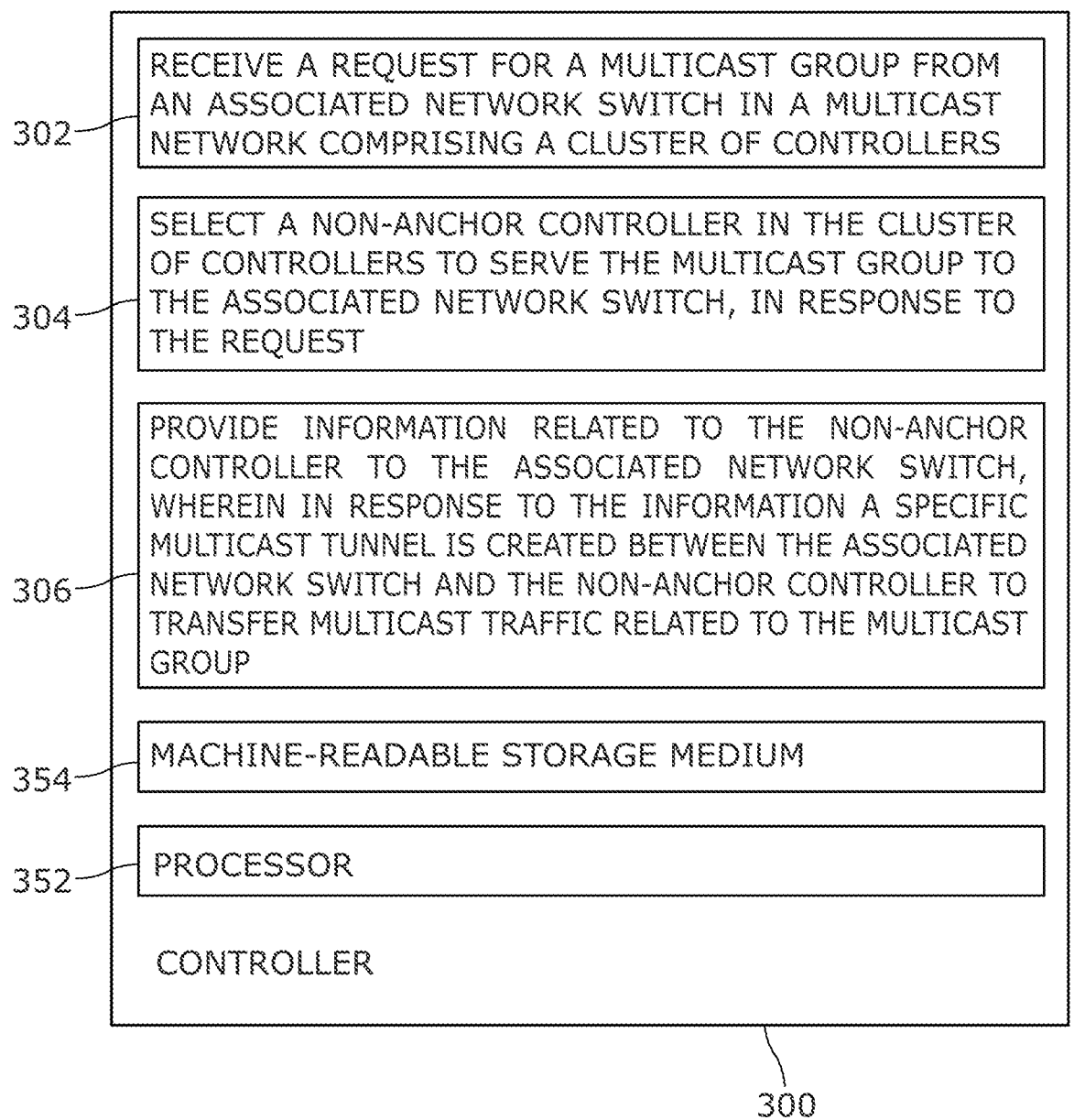
FIG. 3 is a block diagram of an example controller for managing multicast group traffic.

FIG. 3 is a block diagram of an example controller 300 for managing multicast group traffic. In an example, controller 300 may be analogous to switch anchor controllers 112 and 114 FIG. 1, in which like reference numerals correspond to the same or similar, though perhaps not identical, components. For the sake of brevity, components or reference numerals of FIG. 3 having a same or similarly described function in FIG. 1 are not being described in connection with FIG. 3. The components or reference numerals may be considered alike.

Controller 300 may include any server, computing device, dedicated hardware, virtualized device, or the like. In an example, controller 300 may store and execute a computer application (machine-executable instructions). In an example, controller 300 may include a network device (for example, a network switch).

In an example, controller 300 may include a processor 352 and a machine-readable storage medium 354 communicatively coupled through a system bus. Processor 352 may be any type of Central Processing Unit (CPU), microprocessor, or processing logic that interprets and executes machine-readable instructions stored in machine-readable storage medium 354. Machine-readable storage medium 354 may be a random access memory (RAM) or another type of dynamic storage device that may store information and machine-readable instructions that may be executed by processor 352. For example, machine-readable storage medium 354 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 354 may be a non-transitory machine-readable medium.

In an example, machine-readable storage medium 354 may store machine-readable instructions (i.e. program code) 302, 304, and 306 that, when executed by processor 352, may at least partially implement some or all functions of primary source node.

In an example, instructions 302 may be executed by processor 352 of controller 300 to receive a request for a multicast group from an associated network switch in a multicast-capable network comprising a cluster of controllers. The multicast groups in the multicast-capable network may be distributed among controllers in the multicast-capable network in a manner that avoids duplicate multicast groups among the controllers. The controller may represent a device to which the associated network switch registers to in the multicast-capable network.

Instructions 304 may be executed by processor 352 of controller 300 to select a non-anchor controller in the cluster of controllers to serve the multicast group to the associated network switch.

Instructions 306 may be executed by processor 352 of controller 300 to provide information related to the non-anchor controller to the associated network switch. In an example, in response to the information a specific multicast tunnel may be created between the associated network switch and the non-anchor controller to transfer multicast traffic related to the multicast group.

Figure 4:
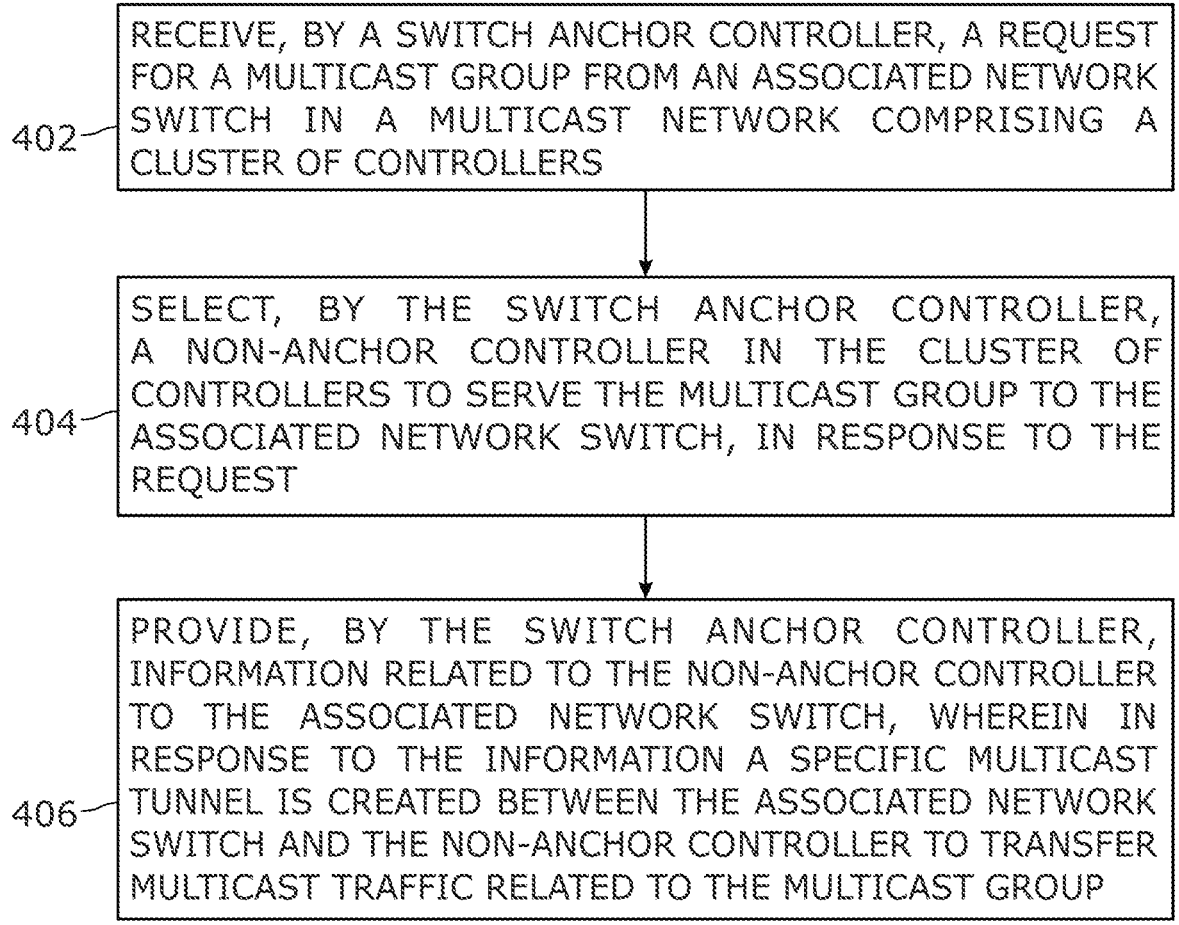
FIG. 4 is a flowchart of an example method for managing multicast group traffic.

FIG. 4 is a flowchart of an example method 400 for managing multicast group traffic. The method 400, which is described below, may at least partially be executed on a controller, for example, switch anchor controllers 112 and 114 of FIG. 1 or controller 300 of FIG. 3. However, other computing or network devices on the multicast-capable network may be used as well. In another example, the method 400 may be executed via an external service (machine-readable instructions) hosted outside of an enterprise, for example, in a cloud computing environment. In another example, the method 400 may executed by a traffic aggregating device in clustering mode such as an Internet of Things (IOT) controller.

At block 402, a switch anchor controller (e.g., 112) may receive a request for a multicast group from an associated network switch in a multicast-capable network comprising a cluster of controllers. The multicast groups in the multicast-capable network may be distributed among controllers in the cluster of controllers in a manner that avoids duplicate multicast groups among the controllers. The switch anchor controller may represent a controller to which the associated network switch registers to in the multicast-capable network.

In response to the request, at block 404, the switch anchor controller may select a non-anchor controller in the cluster of controllers to serve the multicast group to the associated network switch.

At block 406, the switch anchor controller may provide information related to the non-anchor controller to the associated network switch. In an example, in response to the information, a specific multicast tunnel may be created between the associated network switch and the non-anchor controller to transfer multicast traffic related to the multicast group.

Figure 5:
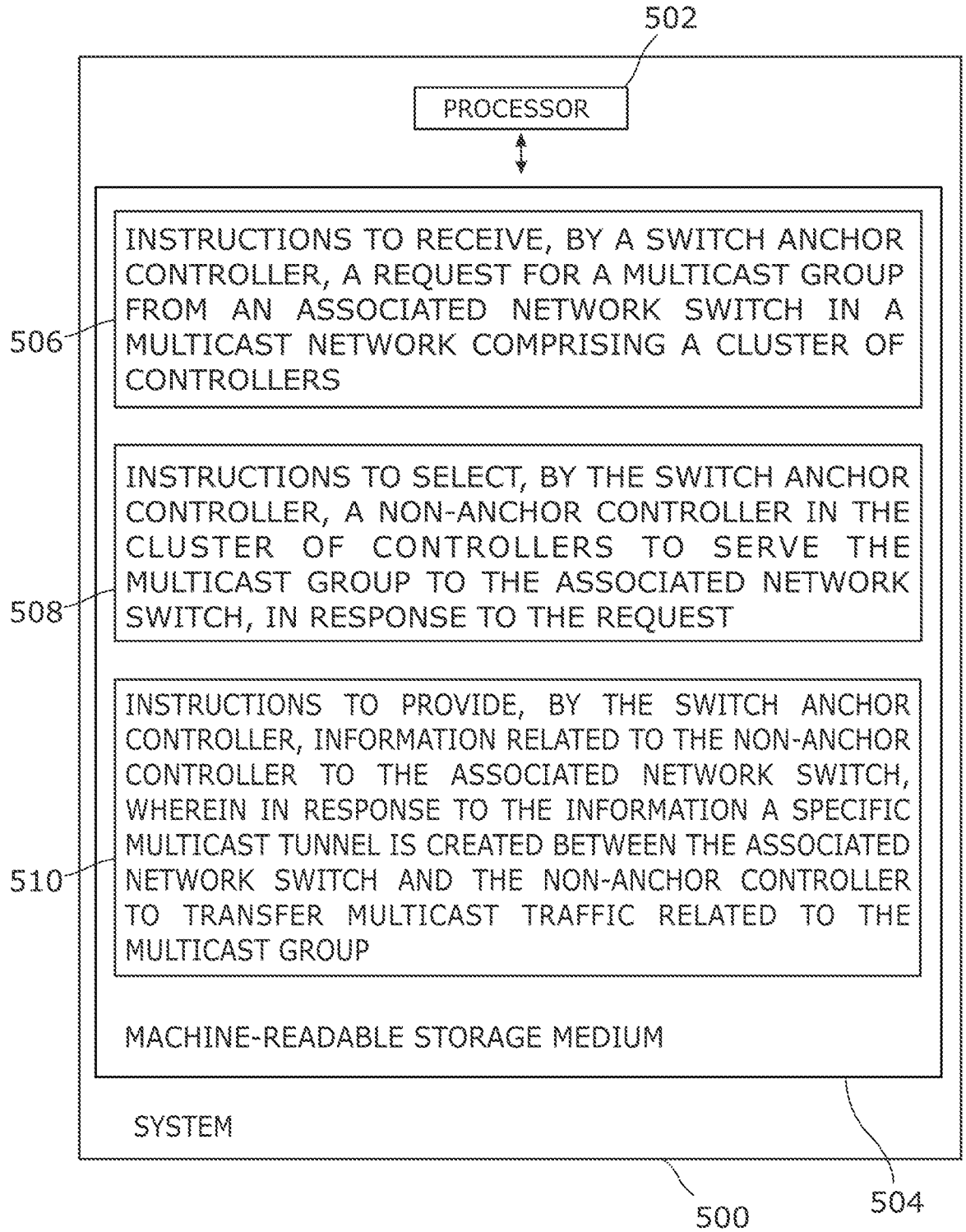
FIG. 5 is a block diagram of an example system including instructions in a machine-readable storage medium to manage multicast group traffic.

FIG. 5 is a block diagram of an example system 500 for managing multicast group traffic. System 500 includes a processor 502 and a machine-readable storage medium 504 communicatively coupled through a system bus. In an example, system 500 may be analogous to switch anchor controllers 112 and 114 of FIG. 1 or controller 300 of FIG. 3. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 504 may be a non-transitory machine-readable medium. Machine-readable storage medium 504 may store instructions 506, 508, and 510.

In an example, instructions 506 may be executed by processor 502 to receive a request for a multicast group from an associated network switch in a multicast-capable network comprising a cluster of controllers. The multicast groups in the multicast-capable network may be distributed among controllers in the cluster of controllers in a manner that avoids duplicate multicast groups among the controllers. The system may represent a controller to which the associated network switch registers to in the multicast-capable network Instructions 508 may be executed by processor 502 to select a non-anchor controller in the duster of controllers to serve the multicast group to the associated network switch, in response to the request.

Instructions 510 may be executed by processor 502 to provide information related to the non-anchor controller to the associated network switch. In an example, in response to the information, a specific multicast tunnel is created between the associated network switch and the non-anchor controller to transfer multicast traffic related to the multicast group.

For the purpose of simplicity of explanation, the example method of FIG. 4 is shown as executing serially, however it is to be understood and appreciated that the present and other examples are not limited by the illustrated order. The example systems of FIGS. 1, 2, 3, and 5, and method of FIG. 4 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution are for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

The invention claimed is:

1. A method comprising:
receiving, by an anchor controller, a request for a multicast group from an associated network switch in a multicast-capable network comprising a cluster of controllers, wherein multicast groups in the multicast-capable network are distributed among controllers of the cluster in a manner that avoids duplicate multicast groups among the controllers, wherein the associated network switch registers to the anchor controller in the multicast-capable network;
in response to the request, selecting, by the anchor controller, a non-anchor controller in the cluster of controllers to serve the multicast group to the associated network switch based on a priority of traffic associated with the multicast group; and
providing, by the anchor controller, information related to the non-anchor controller to the associated network switch, wherein in response to the information indicating that a specific multicast tunnel is created between the associated network switch and the non-anchor controller for transferring multicast traffic related to the multicast group.

2. The method of claim 1, wherein selecting includes selecting the non-anchor controller based on at least one of a processing capacity, memory, and availability of link bandwidth on the controller.

3. The method of claim 1, wherein selecting includes selecting the non-anchor controller based on packet loss data identified for previous multicast streams on the non-anchor controller.

4. The method of claim 1, wherein the distribution of the multicast groups among the controllers is based on a criterion including a type of the requested multicast group.

5. The method of claim 1, wherein selecting includes selecting the non-anchor controller based on a type of the multicast group.

6. The method of claim 1, wherein selecting includes selecting the non-anchor controller based on a security entity score of the controller, wherein the security entity score is at least based on a number of unsecured ports and high-risk security events previously detected on the non-anchor controller.

7. The method of claim 1, wherein one or more of the controllers in the cluster of controllers act as an anchor controller for a respective network switch.

8. The method of claim 1, wherein generic multicast traffic is transferred between the associated network switch and the anchor controller through a generic tunnel.

9. A controller comprising:
a processor; and
a machine-readable medium storing instructions that, when executed by the processor, cause the processor to:
receive a request for a multicast group from an associated network switch in a multicast-capable network comprising a cluster of controllers, wherein multicast groups in the multicast-capable network are distributed among controllers in the cluster in a manner that avoids duplicate multicast groups among the controllers, wherein the associated network switch registers to an anchor controller in the multicast-capable network;
in response to the request, select a non-anchor controller in the cluster of controllers to serve the multicast group to the associated network switch based on a priority of traffic associated with the multicast group; and
provide information related to the non-anchor controller to the associated network switch, wherein in response to the information indicating that a specific multicast tunnel is created between the associated network switch and the non-anchor controller for transferring multicast traffic related to the multicast group.

10. The controller of claim 9, wherein the distribution of the multicast groups among the controllers is based on a criterion.

11. The controller of claim 10, wherein the criterion includes at least one of a processing capacity, memory, and availability of link bandwidth on respective controller.

12. The controller of claim 10, wherein the criterion includes packet loss data identified for previous multicast streams on respective controller.

13. The controller of claim 10, wherein the criterion includes a type of the requested multicast group.

14. The controller of claim 10, wherein the criterion includes a security entity score of respective controller, wherein the security entity score is at least based on a number of unsecured ports and high-risk security events previously detected on the respective controller.

15. A non-transitory machine-readable storage medium comprising instructions, the instructions executable by a processor to:
receive, by an anchor controller, a request for a multicast group from an associated network switch in a multicast-capable network comprising a cluster of controllers, wherein multicast groups in the multicast-capable network are distributed among controllers in the cluster in a manner that avoids duplicate multicast groups among the controllers, wherein the associated network switch registers to the anchor controller in the multicast-capable network;
select, by the anchor controller, a non-anchor controller in the cluster of controllers to serve the multicast group to the associated network switch based on a priority of traffic associated with the multicast group in response to the request; and
provide, by the anchor controller, information related to the non-anchor controller to the associated network switch, wherein in response to the information indicating that a specific multicast tunnel is created between the associated network switch and the non-anchor controller for transferring multicast traffic related to the multicast group.

16. The storage medium of claim 15, wherein one or more of the controllers in the cluster of controllers act as an anchor controller for a respective network switch.

17. The storage medium of claim 15, further comprising instructions to transfer generic multicast traffic between the associated network switch and the anchor controller through a generic tunnel.

18. The storage medium of claim 15, wherein the request for the multicast group originates from a client device.

19. The storage medium of claim 15, wherein the distribution of the multicast groups among the controllers is based on a criterion.

20. The storage medium of claim 15, wherein the non-anchor controller is selected based on a security entity score of the controller, wherein the security entity score is at least based on a number of unsecured ports and high-risk security events previously detected on the non-anchor controller.

* * * * *